United States Patent
Bushnell

(10) Patent No.: US 6,519,335 B1
(45) Date of Patent: Feb. 11, 2003

(54) APPARATUS, METHOD AND SYSTEM FOR PERSONAL TELECOMMUNICATION INCOMING CALL SCREENING AND ALERTING FOR CALL WAITING APPLICATIONS

(75) Inventor: William Jackson Bushnell, St. Charles, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/289,138

(22) Filed: Apr. 8, 1999

(51) Int. Cl.[7] ................................................. H04M 3/42
(52) U.S. Cl. .......................... 379/215.01; 379/208.01; 379/373.01; 379/373.02
(58) Field of Search ............................. 379/93.35, 199, 379/201.01, 208.01, 215.01, 373.01, 373.02

(56) References Cited

U.S. PATENT DOCUMENTS

| | | | | |
|---|---|---|---|---|
| 4,942,601 A | * | 7/1990 | Park ....................... | 379/208.01 |
| 5,636,269 A | * | 6/1997 | Eisdorfer ................ | 379/215.01 |
| 5,812,656 A | * | 9/1998 | Garland et al. ......... | 379/208.01 |
| 5,828,742 A | * | 10/1998 | Khalid et al. ............... | 379/199 |
| 5,848,142 A | * | 12/1998 | Yaker ..................... | 379/215.01 |
| 5,857,017 A | * | 1/1999 | Ohi et al. ..................... | 379/157 |
| 5,999,613 A | * | 12/1999 | Nabkel et al. .......... | 379/215.01 |
| 6,026,156 A | * | 2/2000 | Epler et al. ............. | 379/215.01 |
| 6,160,877 A | * | 12/2000 | Tatchell et al. .............. | 379/197 |
| 6,208,728 B1 | * | 3/2001 | Airaksinen .............. | 379/215.01 |
| 6,289,084 B1 | * | 9/2001 | Bushnell .................... | 379/67.1 |
| 6,415,026 B1 | * | 7/2002 | Flood ..................... | 379/215.01 |

* cited by examiner

Primary Examiner—Ahmad F. Matar
Assistant Examiner—Bing Bui
(74) Attorney, Agent, or Firm—Nancy R. Gamburd

(57) ABSTRACT

An apparatus, method and system are provided for personal telecommunication incoming call screening and alerting for call waiting applications. During a first telecommunication call, the method includes, first, receiving a second telecommunication call, and second, determining a relative priority of the second telecommunication call compared to the first telecommunication call. When the second telecommunication call has a same relative priority or a higher relative priority than the first telecommunication call, the method provides a first level of priority service to the second telecommunication call, such as interrupting the user and providing a distinctive user alert during the first telecommunication call indicative of the same or higher level of priority. When the second telecommunication call has a lower relative priority than the first telecommunication call, the method provides a second level of priority service to the second telecommunication call, such as providing a distinctive user alert indicative of a lower relative priority, and providing automatic messaging or voice mail service to the second telecommunication call. The various embodiments determine these relative priorities based upon user input or based upon the observed, actual behavior of the user or subscriber, such as whether the user allows certain current calls to be interrupted by other incoming calls, whether the consumer accepts and continues with an incoming call while releasing the current call, or whether the consumer returns to the current call from call waiting while releasing the incoming call.

70 Claims, 9 Drawing Sheets

APPARATUS, METHOD AND SYSTEM FOR PERSONAL TELECOMMUNICATION INCOMING CALL SCREENING AND ALERTING FOR CALL WAITING APPLICATIONS

CROSS-REFERENCE TO RELATED APPLICATIONS

This application is related to:

Bushnell, "Apparatus, Method and System for Personal Telecommunication Call Screening and Alerting", U.S. patent application Ser. No. 09/087,442, filed May 29, 1998 and commonly assigned to Lucent Technologies, Inc., incorporated by reference herein, with priority claimed for all commonly disclosed subject matter (the "first related application"); and Bushnell, "Apparatus, Method and System for Personal Telecommunication Speed Calling", U.S. patent application Ser. No. 09/087,412, filed May 29, 1998 and commonly assigned to Lucent Technologies, Inc., incorporated by reference herein, with priority claimed for all commonly disclosed subject matter (the "second related application").

FIELD OF THE INVENTION

The present invention relates in general to telecommunication services and, more particularly, to an apparatus, method and system for personal telecommunication call screening and alerting for call waiting applications.

BACKGROUND OF THE INVENTION

With the advent of sophisticated telecommunication services, telecommunication consumers frequently experience the reception of unwanted or otherwise undesirable telephone calls. For example, telemarketers frequently use computerized calling procedures, which often interrupt consumers at unwanted times, such as at meal times. In other circumstances, with call waiting, consumers may also be interrupted by such an unwanted call while engaged with another, more important or desirable call. Such interruptions are often perceived by consumers as inconvenient, irritating and annoying.

In the prior art, for call waiting applications, telephone customers are able to screen such incoming calls, using a specialized caller identification ("caller ID") or caller name systems (such as call waiting with caller name systems). Under such circumstances, the consumer is interrupted from their current activity, and must personally examine the incoming caller identification information to determine whether they want to answer the incoming call.

In a more general call waiting environment without caller ID or caller name, when engaged with or on a current call, the consumer is not able to screen (or pre-screen) the incoming call, but must actually answer the incoming call to determine its caller or source. Not only is the consumer interrupted from their current call, but also the consumer must personally answer the incoming call to determine whether they wish to continue with the current call, continue with the incoming call, or continue with both the current and the incoming call.

As a consequence, a need remains for an apparatus, method and system that may be used by a telecommunication consumer to automatically screen their incoming calls for or during call waiting situations. Such call screening should occur without personal interruption and without any required user intervention (such as without requiring caller ID examination or answering the incoming call). In addition, such an apparatus, method and system should be user friendly, should be personalized and automatically tailored to the needs, tastes and preferences of individual customers. In addition, the apparatus, method and system should be cost effective and capable of implementation in existing telecommunication systems.

SUMMARY OF THE INVENTION

The present invention provides an apparatus, method and system to screen incoming calls for call waiting applications, without consumer interruption and without personal involvement in the screening process. The present invention provides such automatic screening in accordance with the personal and tailored needs, tastes and preferences of the individual telecommunication consumer. In addition, the apparatus embodiment may be implemented in customer premise equipment, such as telephones, while the system embodiment may be implemented in existing telecommunication systems, such as network switches. The various embodiments may also be expanded to include more than voice communications, such as data communications and video conferencing.

The personal call screening and alerting of the present invention incorporates an "organic persona" concept, such that not only are the services personalized or customized to the needs or preferences of individual consumers, but also the apparatus or system automatically learns these preferences by observing the actions or activities of the individual consumer.

In accordance with the present invention, such personal and individualized automatic call screening and alerting, for call waiting situations, is based upon a statistical or other probabilistic likelihood that the individual consumer does or does not, in fact, want to receive or be interrupted by an incoming call from a particular source at a particular time. Such a likelihood is derived from two sources, first, a measure of an affinity between the calling and called parties, and second, priorities determined by the consumer's past behavior in allowing or not allowing interruptions from an incoming call from the particular source.

The measure of affinity between the calling and called parties is based upon the concept that the called party is more likely to want to receive a call from someone with whom they have a greater or more significant affinity or association, such as their parent or child, and less likely to want to receive a call from someone with whom they have a lesser or no affinity or association, such as a telemarketer or a prankster. As a consequence, calls having a greater affinity measurement may be given a correspondingly higher priority in the screening process, and calls having a lesser affinity may be given a correspondingly lower priority in the screening process. The directory numbers (telephone numbers) corresponding to the calls having such an affinity, in the preferred embodiment, are stored in an affinity database, and are referred to herein as "affinity numbers".

For call waiting purposes, in accordance with the present invention, relative or comparative priorities are then determined between and among the various telephone numbers comprising the affinity database. These priorities are based upon the consumer's past behavior concerning incoming calls, and the relative priorities then provide a means for conflict resolution between potentially competing calls from or to the user's affinity numbers. Utilizing these priorities, an incoming call from a higher priority telephone number is provided with a distinctive, high priority tone and is allowed to interrupt a current call from or to a telephone number having the same or a lower priority. Conversely, however, an incoming call from a lower priority telephone number is provided with a lower priority tone, and may or may not be allowed to interrupt a current call from or to a telephone numbers having a higher priority; instead, in the preferred embodiment, the consumer may decide to not answer the lower priority call, and such a lower priority incoming call may be automatically routed to a voice mail or other answering system.

In accordance with the preferred embodiment of the present invention, such priorities are determined from two sources. First, these priorities may be user determined, as specified or input directly by the consumer. Second, these priorities may be based upon observation of the activities of the consumer, such as whether the consumer allows certain current calls to be interrupted by incoming calls at all; whether the consumer answers and continues with an incoming call while releasing the current call; or whether the consumer answers the incoming call, but releases the incoming call and continues with the current call.

A method for personal telecommunication call screening and alerting during a first telecommunication call, in accordance with the present invention, includes receiving a second telecommunication call during the first telecommunication call, and second, determining a relative priority of the second telecommunication call in comparison to the first telecommunication call. When the second telecommunication call has a same relative priority or a higher relative priority than the first telecommunication call, the method provides a first level of priority service to the second telecommunication call, such as interrupting the first telecommunication call with a distinctive, first priority level user alert, such as a distinctive call waiting tone. When the second telecommunication call has a lower relative priority than the first telecommunication call, the method then provides a second level of priority service to the second telecommunication call, such as interrupting the first telecommunication call with a distinctive, second priority level user alert or tone, or such as not interrupting the first telecommunication call and instead providing automatic messaging or voice mail services for the second telecommunication call.

In the various embodiments, an affinity database is maintained which has a plurality of telephone numbers referred to as affinity numbers. The telephone numbers in the affinity database ("affinity numbers") are determined by including telephone numbers corresponding to the user's outgoing telecommunication calls, and by including telephone numbers corresponding to the user's received incoming calls having a predetermined minimum duration.

Also in the various embodiments, relative or comparative priorities are associated with each affinity number of the affinity database, and are determined either through direct user input, or through observation of the previous activities of the user. Direct user input consists of prior user assignment of at least one relative priority, of the plurality of relative priorities. Observation of prior user behavior involves the determination of at least one relative priority based upon a pair-wise comparison of prior user treatment of an incoming telecommunication call during a current telecommunication call, such as (1) assigning a lower relative priority to the incoming telecommunication call when the incoming telecommunication call has been ignored (not answered) during the current telecommunication call; (2) assigning a higher relative priority to the incoming telecommunication call when the incoming telecommunication call has been answered and selected for continued communication while the current telecommunication call has been terminated; (3) assigning a lower relative priority to the incoming telecommunication call when the current telecommunication call has been selected for continued communication while the incoming telecommunication call was answered but has been terminated; and (4) assigning a same relative priority to the incoming telecommunication call when the incoming telecommunication call has been answered and has been selected for continued communication concurrently with the current telecommunication call.

Numerous other advantages and features of the present invention will become readily apparent from the following detailed description of the invention and the embodiments thereof, from the claims and from the accompanying drawings.

DETAILED DESCRIPTION OF THE PRESENT INVENTION

Figure 1:
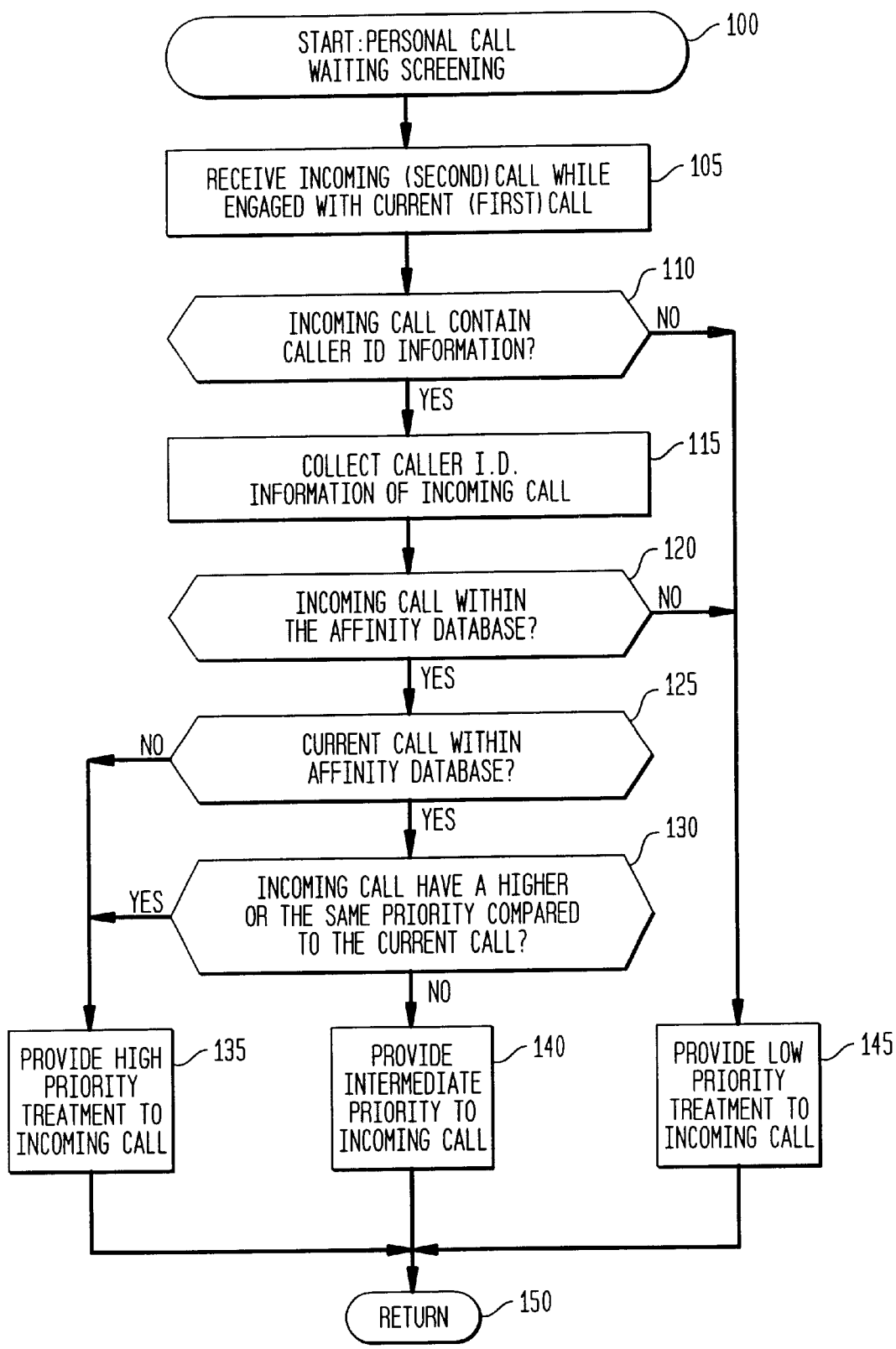
FIG. 1 is a flow diagram illustrating personal telecommunication call screening and alerting for call waiting applications in accordance with the preferred embodiment of the method of the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus, method and system to screen incoming calls for call waiting applications, namely, to screen incoming calls while the user is engaged in a current call, without consumer interruption and without personal involvement in the screening process. The present invention provides such automatic screening of incoming calls without such interruption or personal involvement, and provides such screening in accordance with the personal and tailored needs, tastes and preferences of the individual telecommunication consumer. In addition, the apparatus, method and system are user friendly, cost effective, and capable of implementation in existing telecommunication systems.

The personal call screening and alerting of the present invention incorporates an "organic persona" concept. "Persona" refers to services that are personalized or customized to the needs or preferences of individual consumers. "Organic" refers to services in which a telecommunication network or system automatically learns these preferences by observing the actions or activities of the individual consumer.

As mentioned above, in accordance with the present invention, such personal and individualized automatic call screening and alerting is based upon a statistical or other probabilistic likelihood that the individual consumer does or does not, in fact, want to receive or be interrupted by an incoming call from a particular source at a particular time. Such a probabilistic likelihood is derived from two sources, namely, priority determinations and affinity determinations, as discussed in greater detail below.

First, a measure of an affinity is determined between the calling and called parties, such that the called party is more likely to want to receive a call from someone with whom they have a greater or more significant affinity or association, such as their parent or child, and less likely to want to receive a call from someone with whom they have a lesser or no affinity or association, such as a telemarketer. As a consequence, in accordance with the present invention, calls having a greater affinity measurement may be given a correspondingly higher priority in the screening process, and calls having a lesser affinity may be given a correspondingly lower priority in the screening process. Directory numbers corresponding to calls made by the user, and calls received by the user which have a minimum, predetermined holding period, are added to a database (the "affinity database") and are referred to herein as "affinity numbers".

For call waiting purposes, in accordance with the present invention, relative or comparative priorities are then determined between and among the various telephone numbers comprising the affinity database. These priorities then provide a means for conflict resolution between potentially competing calls from or to the user's affinity numbers. Utilizing these priorities, an incoming call from a higher priority telephone number is provided with a distinctive, high priority alert and is allowed to interrupt a current call from or to a telephone number having the same or a lower priority. Conversely, however, an incoming call from a lower priority telephone number is provided with a distinctive, lower priority alert, and may or may not be allowed to interrupt a current call from or to a telephone numbers having a higher priority; instead, in the preferred embodiment, the consumer receives the lower priority alert and may choose to not be interrupted, with the lower priority incoming call automatically routed to a voice mail or other answering system.

In accordance with the preferred embodiment of the present invention, such relative or comparative priorities are determined from two sources, also utilizing the organic persona concept. First, these priorities may be user determined, as specified or input directly by the consumer. Second, these priorities may be based upon observation of the past activities of the consumer, such as whether the consumer has allowed certain current calls to be interrupted by incoming calls (i.e., whether the user ignored the incoming call); whether the consumer has answered and continued with an incoming call while having released the current call; whether the consumer previously answered the incoming call but returned to the current call and released the incoming call; or whether the consumer answered the incoming call and maintained both the incoming call and the current call.

In addition, in the preferred embodiment, the consumer also may select or program his or her preferences, priorities, and system activation or deactivation times, typically through a user interface. The consumer or other user may also designate a range of incoming telephone numbers to have a particular priority, such as for business calls from a particular exchange. For example, a user may want to designate a range of incoming numbers to always have a high priority which may come from a particular client, customer or business associate, such as 847-248-xxxx incoming calls from Lucent Technologies, Inc. (designating a range of numbers from 847-248-0000 to 847-248-9999).

FIG. 1 is a flow diagram illustrating incoming personal call screening and alerting for call waiting applications in accordance with the preferred method embodiment of the present invention. As discussed in greater detail below, the methodology of the present invention, as illustrated in FIGS. 1–6, may be programmed and stored, as a set of program instructions for subsequent execution, in a processor and its associated memory. Such processor embodiments are illustrated as apparatus and system embodiments in FIGS. 7, 8 and 9.

Referring to FIG. 1, beginning with start step 100, while the called party is engaged with or on a current (or first) call, the method begins with the reception of an incoming (or second) call, step 105, as in a typical or known call waiting situation. The present invention utilizes incoming caller identification information provided by a central office or other network to determine whether an incoming call is from someone within the called parties' affinity database. (As discussed in greater detail below, under various circumstances, private caller ID information may also be utilized without actual disclosure to the called party.) If the incoming call does not have caller identification information in step 110, such as a call from a telemarketing firm having a blocked or unidentified number, that incoming call is treated with a lower or second priority service, step 145. When the incoming call has caller identification information in step 110, that caller ID information is collected or otherwise utilized, step 115, as discussed below.

As discussed in greater detail below, various attributes of the incoming call are compared to the current call to determine how the incoming call is to be treated (screened). This comparison is based upon determining whether the incoming call and the current call are to/from directory numbers within the user's affinity database, and when within the database, determining the relative or comparative priority of the incoming call versus the current call. As illustrated in greater detail below, there are two underlying presumptions of the preferred embodiment: (1) an incoming call from a directory number which is not in the user's affinity database is given a comparatively lower priority treatment (whether or not the current call is to/from a directory number within the user's affinity database); and (2) when the current call is from a directory number which is not within the user's affinity database, an incoming call from a directory number which is in the user's affinity database is given a comparatively higher priority treatment (noting that a current call made by a user to a directory number is placed into the user's affinity database, FIG. 2). Other underlying presumptions or priority assignments may be utilized without departing from the spirit and scope of the present invention.

Continuing to refer to FIG. 1, the method then determines whether the incoming caller identification information (such as a telephone number) is in the called parties' affinity database, step 120. When the incoming caller identification information is not in the called parties' affinity database in step 120, that incoming call is also treated with the lower or second priority service, step 145. During this step 120, it may also be the case that the directory number of the current call is also not in the user's affinity database, either because this is the first time a call has been received from that directory number or because it is an unwanted call. Under such circumstances, for the preferred embodiment, the invention presumes that the user nonetheless would prefer having the incoming call treated with a comparatively lower or second priority treatment (although as mentioned above, other levels of treatment may be assigned without departing from the spirit and scope of the present invention). In addition, as illustrated below with respect to FIGS. 2–4, depending upon the user's treatment of the current call, the corresponding affinity number also may be entered into the affinity database. Other circumstances in which the current call is not within the affinity database are addressed below with regard to step 125, FIG. 1.

Continuing to refer to FIG. 1, step 145, such a lower or second priority service or treatment may include providing a distinctive, lower or second priority alert; sending the incoming call to an answering or voice mail system; or may include various user determined or selected announcements. For example, various announcements may include statements such as "the user does not wish to receive unsolicited calls", "the user is currently not available, so please call back after 8 p.m.", or simply "please leave a message after the tone". Alternatively, such second or lower priority service or treatment may also include a different, distinctive alerting pattern, to distinguish such lower priority incoming calls from higher priority calls. Such low or lowest priority calls may also be allowed to generate a ringing signal on the line (back to the calling party) without providing a user alert (to the called party) and without answering or messaging, of any kind.

When the incoming caller identification information is in the called parties' (user's) affinity database, step 120, that incoming identification information is utilized to compare the incoming call to the current call, under a variety of circumstances. First, in step 125, the method determines whether the current call is to/from a directory number within the user's affinity database. When the incoming call is from a directory number within the user's affinity database (step 120), but the current call is not from a directory number within the user's affinity database (step 125), a higher priority treatment is provided to the incoming call, step 135. When the incoming call is from a directory number within the user's affinity database (step 120), and the current call is from a directory number within the user's affinity database (step 125), then the relative priorities of the incoming and current calls are compared in step 130.

In step 130, the method determines whether the incoming (second) call has the same or a higher level of priority, compared to the current (first) call, for the given time period. When the incoming caller identification information indicates that the calling party has the same as or a higher level of priority than the current (first) call, that incoming call is given higher or first priority service (treatment), step 135, such as providing a distinctive, higher or first priority alert or other distinctive, high priority call waiting tone.

For example, in accordance with the present invention, certain calling parties within the affinity database, such as parents, children, close friends and business associates, may be given a higher priority service. Such a higher priority service may include allowing those calls at all times, allowing those calls to interrupt current calls via a call waiting system, and further providing a higher priority alert, such as a different alerting pattern which distinguishes such higher priority calls from lower priority calls. Similarly, other calling parties within the affinity database, such as distant relatives and acquaintances, may be given a more intermediate priority service, such as providing a distinctive alerting tone indicative of an intermediate priority call, or not allowing those calls to interrupt higher priority calls, or allowing those calls except during certain times (such as meal times), when they are transferred to an answering or messaging system. As a consequence, when the incoming caller identification information indicates that while the incoming call is from a calling party within the affinity database (step 120), but the incoming call from the calling party does not have the same or higher priority than the current call in step 130, then that incoming call is given an intermediate priority (or third type of priority) treatment, step 140.

Conversely, a user may choose to not differentiate between and among the various calling parties in his or her affinity database, in which case all incoming calls from a calling party within the affinity database may be given the same level of priority treatment, such as first priority treatment, omitting step 130 and proceeding directly to, for example, step 135 from step 125. As another alternative, a user may select only two levels of priority, higher and lower, omitting an intermediate level of priority; in such case, step 140 is omitted, with lower priority incoming calls (from step 130) receiving the second priority treatment of step 145. Following steps 135, 140 or 145, the incoming call screening method may end, return step 150.

In the preferred embodiment, through a user input and a user display, the user may select or program various alternatives and preferences, such as the varying levels of priority treatment mentioned above. The user may also manually override any of the automatic selections (FIGS. 2–6, discussed below), such as deleting or adding a number from or to the affinity database, or selecting a higher or lower priority for a given number in the affinity database. For example, there may be calls from people that the user always wants to receive and for which the user always wants a high priority alert for their incoming calls, even if they are not frequent or long duration calls. As a consequence, through a user display of their personal affinity database, with a user input, the user may flag or designate certain numbers for particular treatment, may add numbers which otherwise would not be in the affinity database, may delete numbers, and may provided that certain numbers always remain in the database (even if used infrequently). This user interactive method and system may also be implemented, for example, using interactive voice response with menu options, for example, indicating varying levels of priority treatment, recording of outgoing messages, and means to add, delete, and flag various numbers. Also as disclosed in the second related application, name information corresponding to an affinity number may also be included in the affinity database, for ease of user reference.

The apparatus, method and system of the present invention may also be programmed to automatically activate and deactivate the call screening service at specified times of the day, for example, at meal times, in the late evening, or whenever a consumer does not wish to be disturbed.

As indicated above, in accordance with the present invention, incoming calls are automatically screened based on measures of affinity and priority, based upon observed, past user behavior (with, of course, user override capability). In the preferred embodiment of the invention, affinity is measured or determined utilizing the concept that consumers have a higher affinity and are more likely to want to receive calls from people that they either call themselves, or from people with whom previously they have had long conversations. Conversely, a lesser or non-affinity is based upon consumers being less likely to want to receive a call from people they themselves do not call, or from people with whom they have never had a long conversation (such as unwanted telemarketers, wrong numbers and prank calls). As illustrated in greater detail below with respect to FIGS. 2–6, the preferred method embodiment develops an affinity database as an affinity list or stack of preferred numbers, with corresponding priorities, by storing the telephone numbers of all calls originated by the user's telephone, and storing incoming caller ID information from those telephone calls having a minimum, predetermined duration (along with corresponding priorities). Other database management methods may also be utilized.

Also in the preferred embodiment, priorities are determined based upon two sources, also utilizing the organic persona concept. First, these priorities may be user determined, as specified or input directly by the consumer, as mentioned above. Second, these priorities may be automatically determined based upon observation of the past activities of the consumer, as illustrated below with respect to FIG. 4, such as whether the consumer allows certain current calls to be interrupted by incoming calls (or ignores the incoming calls); whether the consumer answers and continues with an incoming call while releasing the current call; whether the consumer returns to the current call from call waiting while releasing the incoming call; or whether the consumer maintains both the current call and the incoming call.

Figure 2:
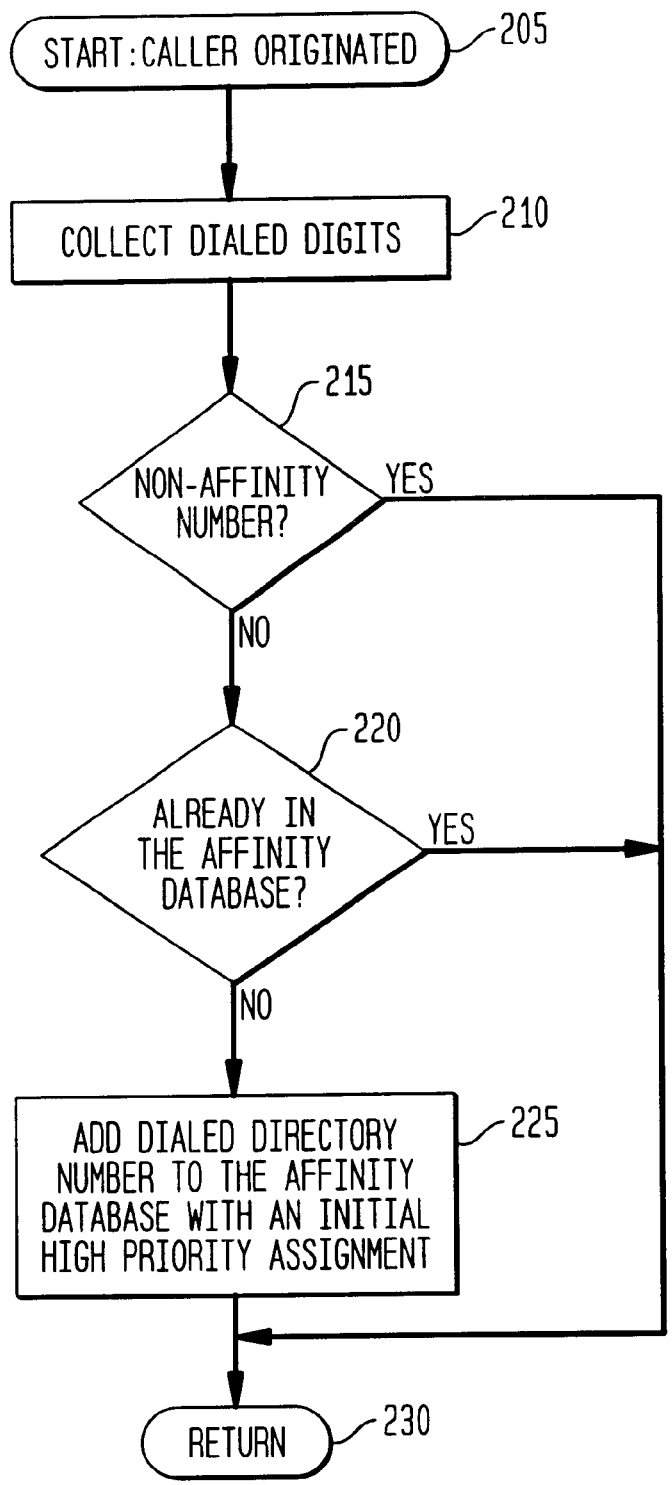
FIG. 2 is a flow diagram illustrating an affinity data generation routine from caller originated communications in accordance with the method of the present invention.

FIG. 2 is a flow diagram illustrating an affinity data generation routine based upon user originated calls. The method begins, start step 205, when the user originates a telephone call or other telecommunication session. The method collects and stores the dialed number (digits), step 210, such as the numerical digits entered by the caller. Next, in step 215, the method determines whether the collected dialed telephone digits are for a non-affinity number, such as 800 or 888 numbers, 911 emergency numbers, 411 and 1-area code-555-1212 directory assistance calls. When the dialed digits are for such a non-affinity number in step 215, or when the directory number is already within the affinity database, step 220, the affinity data generation routine may end, return step 230. When the dialed digits are not for a non-affinity number in step 215, i.e., the dialed digits are for an ordinary telephone number, then in step 225 that directory (telephone) number is added to the affinity database as an affinity number (unless the directory number is already in the affinity database, step 220). In the preferred embodiment, when a directory number is added to the affinity database as an affinity number, that affinity number is initially assigned a high priority (and may be placed at the top of the affinity list, FIG. 5), under the presumption that the consumer wants to receive calls from someone they have just called recently. Such initial priority assignments may change, as discussed below with respect to FIG. 4. Following step 225, the caller originated data generation routine of the preferred method embodiment may end, return step 230.

Figure 3:
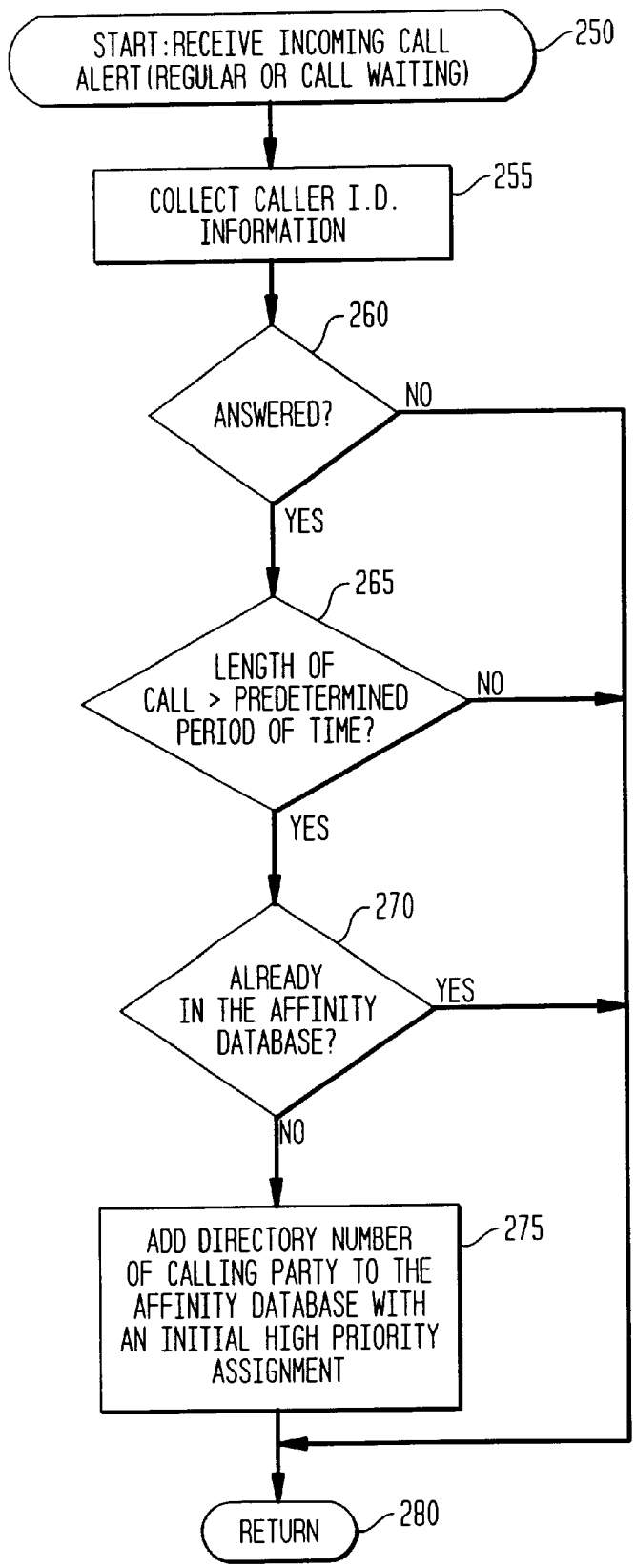
FIG. 3 is a flow diagram illustrating an affinity data generation routine from incoming calls in accordance with the method of the present invention.

FIG. 3 is a flow diagram illustrating affinity data generation based upon incoming calls. Beginning with reception of an incoming call (which may be a typical incoming call or an incoming call during a call waiting situation), start step 250, the method collects and stores caller ID information (such as an incoming telephone number), step 255. When the user has answered or accepted the incoming call, step 260, and when the duration or length of that call is greater than a minimum or other predetermined period of time, step 265, then the caller ID information (directory number) for that incoming call is added to the affinity database, step 275 (unless the directory number is already in the affinity database, step 270). In the preferred embodiment, when a directory number is added to the affinity database as an affinity number, that affinity number is initially assigned a high priority (and may be placed at the top of the affinity list, FIG. 5), under the presumption that the consumer wants to receive calls from someone that has just called them recently. Such initial priority assignments may change, as discussed below with respect to FIG. 4.

In the preferred embodiment, for step 265, the user may specify or program what predetermined period of time he or she would like as a minimum incoming call duration for adding an incoming call telephone number to the affinity database, based on his or her individual conversation patterns. For example, a particular user may feel that only incoming calls lasting more than five minutes should be included in the affinity database, while another less talkative user may want all calls lasting more than three minutes. Default values may also be provided for the predetermined period of time, such as three minutes. In addition, varying values may also be provided, with correspondingly higher priorities assigned to longer calls. When the user either does not answer the incoming call (in step 260), or when the duration of the incoming call is less than the predetermined period of time (in step 265), or when the directory number is already within the affinity database (in step 270), the method does not add that caller ID information to the affinity database, and the incoming call affinity database generation routine of the preferred method embodiment may end, return step 280. As mentioned above, as an affinity measurement, the method presumes that an unanswered call or a call of such a short duration is due to the unwanted nature of the incoming call, and as a consequence, that incoming caller ID information is not automatically added to the affinity database, but may be added through user input.

Figure 4:
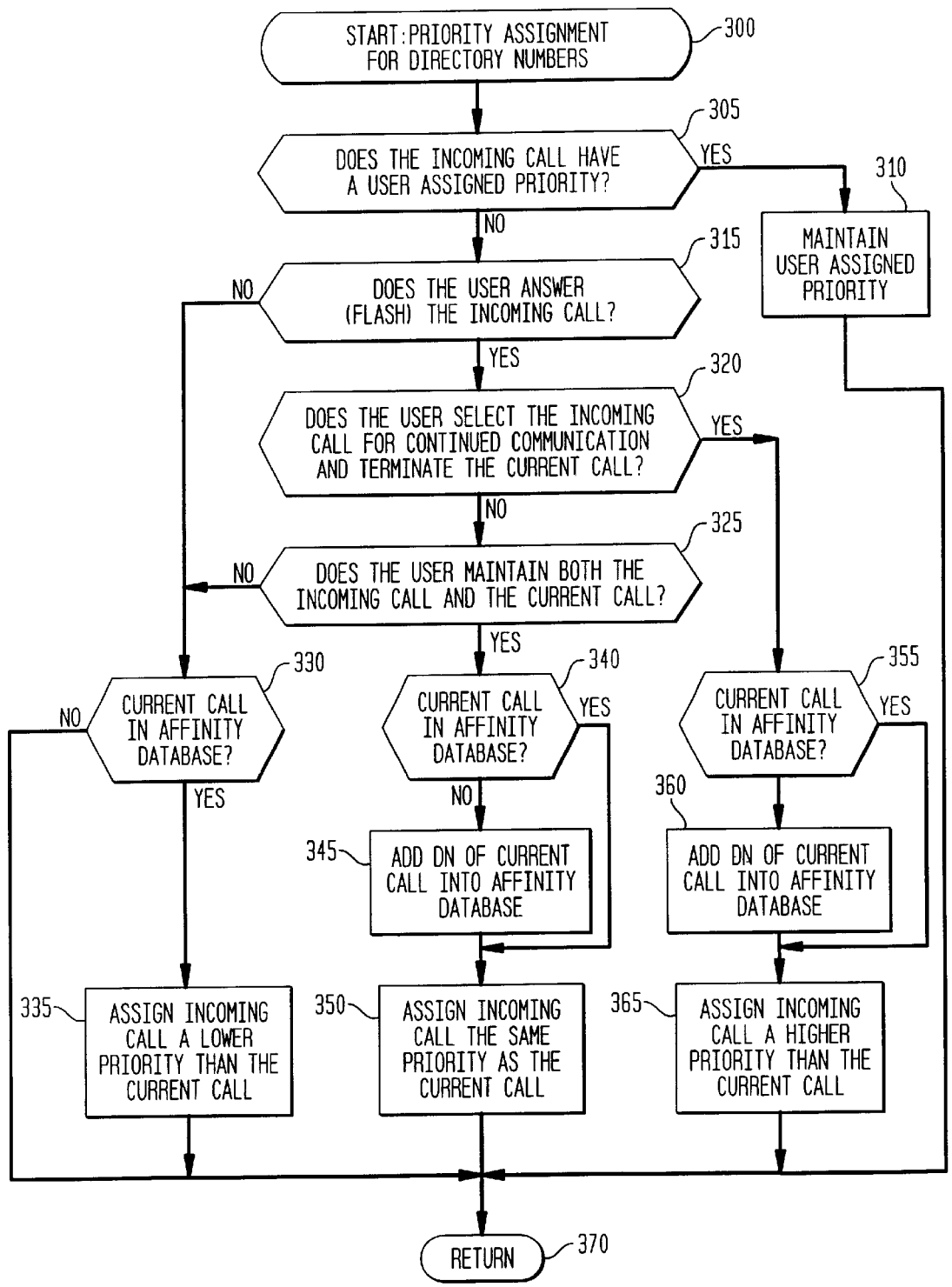
FIG. 4 is a flow diagram illustrating priority assignment in accordance with the preferred method embodiment of the present invention.

FIG. 4 is a flow diagram illustrating priority assignment for call waiting in accordance with the preferred method embodiment of the present invention. As mentioned above, in accordance with the present invention, comparative priorities for potentially competing affinity numbers are established from two sources. First, the user or subscriber may establish such priorities, determining that incoming calls from particular sources may be given a high, intermediate or low priority, during particular time periods, compared to incoming or current calls from other sources. Second, these comparative priorities may be based upon observation of the past activities of the consumer, such as: (1) whether the consumer answers or ignores incoming calls from certain affinity numbers during current calls from other affinity numbers; (2) whether the consumer answered and continued with an incoming call from a certain affinity number while having released a current call from a different affinity number; (3) whether the consumer answered the incoming call but returned to a current call from a certain affinity number while having released an incoming call from a different affinity number; or (4) whether the consumer answered the incoming call and also maintained an incoming call from a certain affinity number concurrently with a current call from a different affinity number. Based upon either these past activities or user assignment, established priorities are then utilized, as discussed above with reference to FIG. 1, to screen incoming calls for call waiting purposes.

In the preferred embodiment, such relative or comparative priorities among affinity numbers are determined in a pair-wise manner, based upon the actual reception in the past of an incoming (second) call during a current (first) call. Because all possible incoming versus current pairings may not occur between and among all affinity numbers, the priorities which are established pair-wise are then logically extended to the remaining affinity numbers. For example, if a call from affinity number "A" has a higher priority than a call from affinity number "B", and if a call from affinity number "B" has a higher priority than a call from affinity number "C", then a call from affinity number "A" may also be considered to have a higher priority than a call from affinity number "C". Subsequently, for example, when the user receives an incoming call from affinity number "A" while the user is engaged with a current call from affinity number "C" (FIG. 1, step 105), given that an incoming call from affinity number "A" has a higher priority than one from affinity number "C" (FIG. 1, step 130), the incoming call from affinity number "A" will receive a high priority treatment (FIG. 1, step 135), such as a high priority user alert or tone.

Similarly, if a call from affinity number "D" has a higher priority than a call from affinity number "F", and if a call from affinity number "E" has a higher priority than a call from affinity number "F", then a call from affinity number "D" may be considered to have the same priority as a call from affinity number "E" (unless other call sequences have established that calls from either "E" or "D" has a higher priority than the other. It will be readily apparent that a multitude of priority assignment methods may be utilized equivalently without departing from the spirit and scope of the present invention.

As mentioned above, these priorities between and among calls from the various affinity numbers are determined from the past activities of the user, for subsequent, later use of these priorities to screen incoming calls during call waiting, as discussed above with reference to FIG. 1. As a consequence, the priority assignment methodology illustrated in FIG. 4 will generally have occurred prior to, and independently of, the incoming call screening of FIG. 1. In addition, because not all pairings of affinity numbers may occur, as mentioned above, the current (first) call and the incoming (second) call referred to with respect to FIG. 4 may or may not be, respectively, the same current (first) call and the same incoming (second) call referred to with respect to FIG. 1.

Referring to FIG. 4, beginning with start step 300, the priority assignment methodology of the present invention first determines, during a current (or first) call, whether an incoming (or second) call is from an affinity number that has a user or subscriber assigned priority, step 305. When the incoming (second) call is from an affinity number which has a user or subscriber assigned priority in step 305, the method maintains the assigned priority for any incoming call from that affinity number, step 310. When the incoming call is not from an affinity number which has a user or subscriber assigned priority in step 305, the method then proceeds to determine a priority for the incoming call, based upon the observed activities of the user, utilizing the organic persona concept, proceeding to step 315.

In step 315, the method first determines whether the user has answered (or is answering) an incoming call from this incoming affinity number during the current call (with its corresponding current affinity number), such as whether the user answered or responded to the incoming call or whether the user ignored the call waiting tone or other alert of the incoming call and did not answer the incoming call. When the user has not answered the incoming call (with its corresponding affinity number) in step 315, indicating that the current call has a higher priority, then if the incoming call (and its corresponding incoming affinity number) is within the affinity database (step 330), it is assigned a comparatively lower priority than the current call, step 335. In the event that the incoming call was ignored (step 315) and the incoming call was not from an affinity number (step 330), such as an incoming call from a telemarketer, then no priority is assigned to the incoming call, and the method may end, return step 370.

When in step 315 the user has answered the incoming call during the current call, the method determines how the user treated the incoming call in comparison to the current call, proceeding to step 320. Once the user has answered the incoming call, there are three logical possibilities for call treatment: (1) the user selected the incoming call for continued communication and terminated the current call; (2) the user maintained both calls for continued communication (such as toggling back and forth between the calls); or (3) the user kept or selected the current call for ongoing communication while terminating the incoming call. One of these three situations will have occurred, even if the user subsequently calls back the other party of the incoming or current call to resume the communication (following either possibility (1) or (3) above). These possibilities of call treatment are incorporated into the flow diagram of FIG. 4.

With the incoming call having been answered in step 315, then in step 320, the method determines whether the user selected the incoming call and terminated the current call, indicating that the incoming call is more significant or has a higher priority than the current call. If in step 320 the user selected the, incoming call and terminated the current call, then following a determination of whether the directory number of the incoming call is within the affinity database (steps 355 and 360), the incoming call (and corresponding incoming affinity number) is assigned a comparatively higher priority than the current call (with its corresponding current affinity number), step 365. As indicated above, if for some reason the answered and continued incoming call is not already within the affinity database (step 355), that directory number is added to the affinity database (step 360), with a comparatively higher priority assigned (step 365). When the directory number of the incoming call is already within the affinity database (step 355), the comparatively higher priority may be assigned directly (step 365).

If in step 320 the user did not select the incoming call and terminate the current call, the method proceeds to step 325 and determines whether the user maintained both the incoming call and the current call, i.e., whether the user kept both the incoming and the current calls active during the same time period. If in step 325 the user maintained both the incoming call and the current call, indicating that the incoming call has the same level of importance as the current call, then also following a determination of whether the directory number of the incoming call is within the affinity database (steps 340 and 345), the incoming call (and corresponding incoming affinity number) is assigned the same relative priority level as the current call (with its corresponding current affinity number), step 350. Also as indicated above, if for some reason the answered and continued incoming call is not already within the affinity database (step 340), that directory number is added to the affinity database (step 345), with the same comparative priority assigned (step 350). When the directory number of the incoming call is already within the affinity database (step 340), the same comparative priority may be assigned directly (step 350).

Conversely, when the user did not select the incoming call and terminate the current call in step 320, and when the user did not maintain both the incoming and current calls in step 325, indicating (by default) that the user continued with the current call and terminated the incoming call, the method determines that the current call is more important or significant than the incoming call. As a consequence, if the directory number of the incoming call is within the affinity database (step 330), the incoming call (and corresponding incoming affinity number) is assigned a lower relative priority level than the current call (with its corresponding current affinity number), step 335. To avoid adding an unwanted number to the affinity database, even though the incoming call was answered, under these circumstances the preferred embodiment does not utilize a database addition step (comparable to steps 345 or 360). Rather, the method assumes that if a desirable incoming call was received but terminated (with the current call continued), the user will at some point return the call to the party of the incoming call and, at that time, the directory number will be added to the user's affinity database (FIG. 2). Following steps 335, 350 and 365, the priority assignment portion of the method may end, return step 370.

Figure 5:
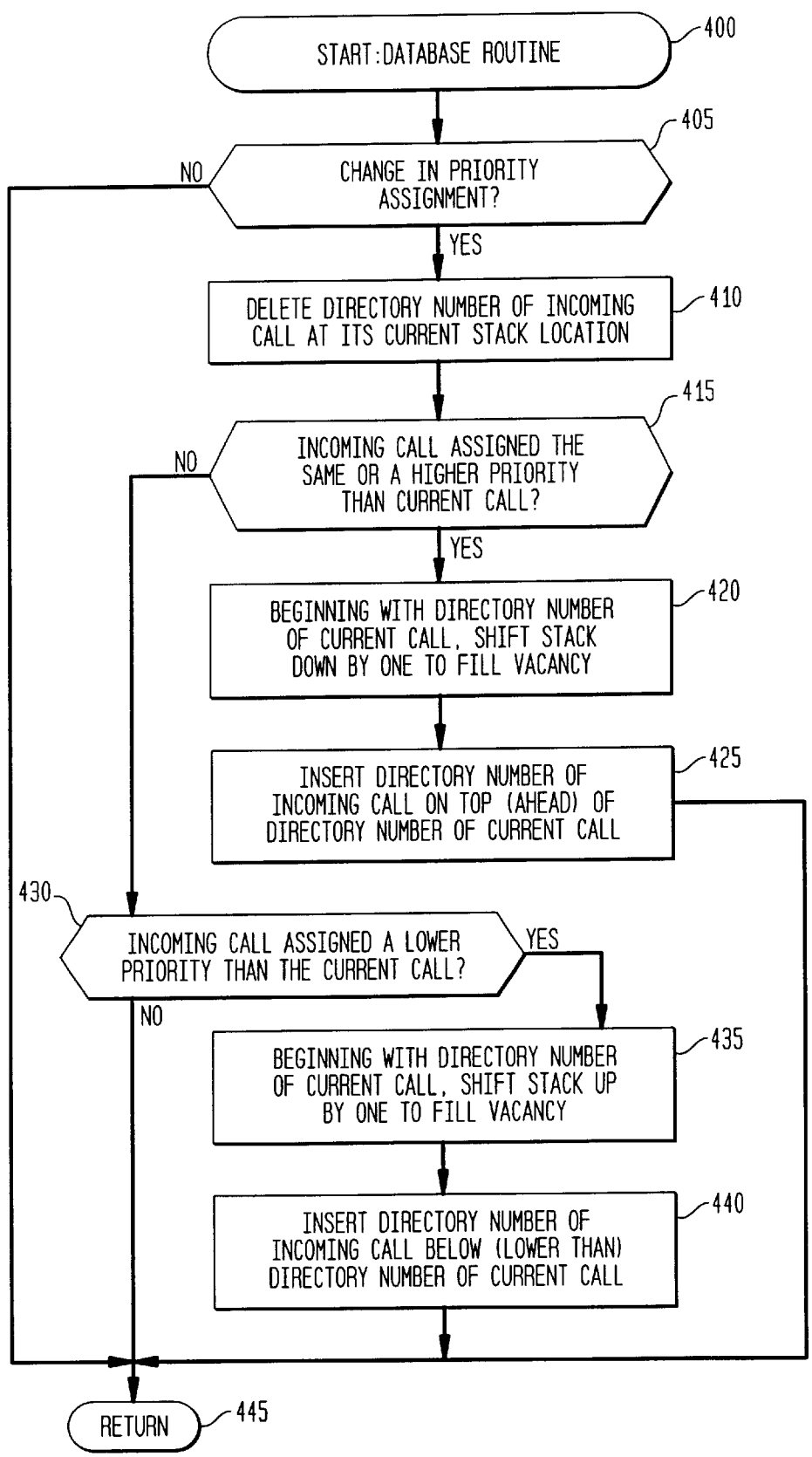
FIG. 5 is a flow diagram illustrating a first method for affinity database management in accordance with the present invention.

FIG. 5 is a flow diagram illustrating a first method for affinity database management in accordance with the present invention. In this first embodiment, the affinity database is managed as a list or a stack, with the comparatively higher priority affinity numbers clustered at the top or upper portion of the stack. As mentioned above, new affinity numbers are added to the affinity database during step 225 (FIG. 2) or during step 275 (FIG. 3), and are initially assigned a comparatively high priority, placing them at the top of the stack. Also as mentioned above, based upon the user's preferences or the user's activities, these relative priorities may change over time (FIG. 4). As a consequence, beginning with start step 400, this routine is utilized when there has been a change in the relative or comparative priority assigned to a given affinity number, step 405, based upon the priorities assigned in the routine of FIG. 4.

There are, moreover, myriad other equivalent ways of both managing the affinity database and assigning such priorities, including user input and programming options. For example, as the affinity database is generated, user input may be utilized to add or delete telephone numbers, and to assign corresponding priorities. Also for example, such user input may occur through an interactive voice menu or an interactive display. These various methods of management and prioritization may also be combined, utilizing any number of ordering or statistical algorithms. As a consequence, another method of affinity database management is illustrated below with reference to FIG. 6.

Referring to FIG. 5, when there has been a change in the relative priority assigned to an incoming call (having its corresponding incoming affinity number), step 405, the method deletes the incoming affinity number at its current stack location, step 410. When the incoming call (with its corresponding incoming affinity number) is or has been assigned the same or a higher relative priority than the current call (with its corresponding current affinity number), step 415, then beginning with the affinity number of the current call, the stack of affinity numbers is shifted down by one to fill the vacancy (left by the deletion of the incoming affinity number), step 420. The incoming affinity number (corresponding to the incoming call) is then inserted in the stack on top (or ahead) of the current affinity number (corresponding to the current call), step 425, and this database management routine may end, return step 445.

When the incoming call (with its corresponding incoming affinity number) is not or has not been assigned the same or a higher relative priority than the current call (with its corresponding current affinity number) in step 415, the method proceeds to step 430. In step 430, the method determines whether the incoming call (with its corresponding incoming affinity number) has been assigned a lower comparative priority than the current call (with its corresponding current affinity number). When the incoming call has been assigned a lower priority, step 430, then in step 435, beginning with the affinity number of the current call, the method then shifts the affinity database stack up by one to fill the vacancy (left by the deletion of the incoming affinity number at its then current location, step 410). The incoming affinity number (corresponding to the incoming call) is then inserted in the stack below (or behind) the current affinity number (corresponding to the current call, step 440, and this database management routing may end, return step 445. In this way, the relative or comparative priority corresponding to a given affinity number may be ascertained based upon stack location for use, for example, in the screening process illustrated in FIG. 1.

Not separately illustrated, when the affinity database is also to be maintained as a stack, other management methods may be utilized in lieu of or in addition to the methodology illustrated in FIG. 5. For example, new affinity telephone numbers may be inserted initially into the middle or center of the stack. Subsequently, based upon its evolving relative priority as determined, for example, by the methodology illustrated in FIG. 4, a corresponding telephone number will percolate up in the stack or be pushed down in the stack.

Figure 6:
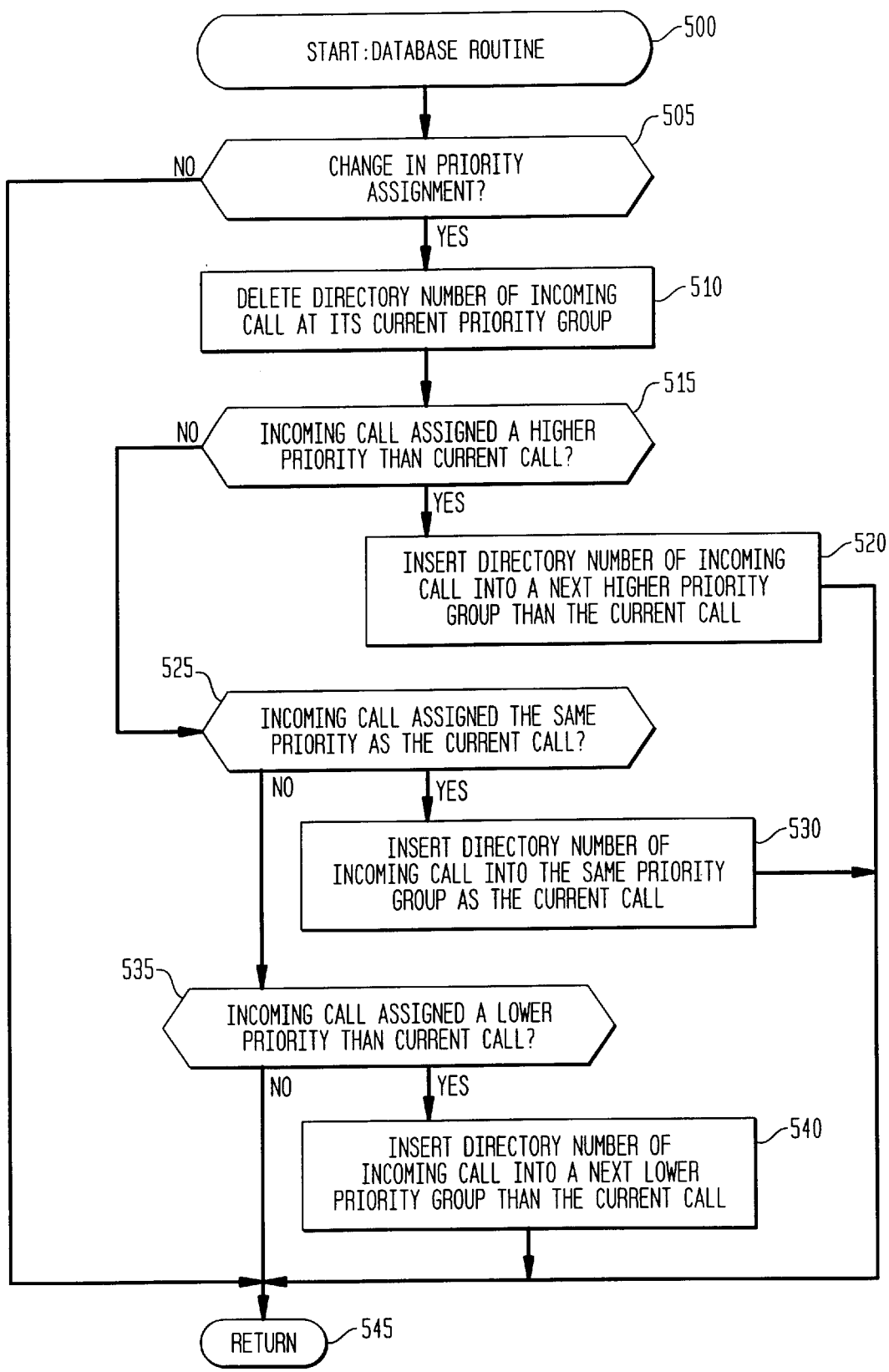
FIG. 6 is a flow diagram illustrating a second method for affinity database management in accordance with the present invention.

FIG. 6 is a flow diagram illustrating a second method for affinity database management in accordance with the present invention. In this second embodiment, the affinity database is managed as a plurality of discrete relative groupings or sets, with the comparatively higher priority affinity numbers clustered in a first set, the intermediate or next lower priority affinity numbers clustered in a second set, and so on, through the lowest priority affinity numbers clustered in an $n^{th}$ set. Also as mentioned above, new affinity numbers are added to the affinity database during step 225 (FIG. 2) or during step 275 (FIG. 3), and are initially assigned a comparatively high priority, placing them in a high priority group or set. Also as mentioned above, based upon the user's preferences or the user's activities, these relative priorities may change over time (FIG. 4). As a consequence, beginning with start step 500, this routine is also utilized when there has been a change in the relative or comparative priority assigned to a given affinity number, step 505, based upon the priorities assigned in the routine of FIG. 4.

Referring to FIG. 6, when there has been a change in the relative priority assigned to an incoming call (having its corresponding incoming affinity number), step 505, the method deletes the incoming affinity number from its current set or group, step 510. When the incoming call (with its corresponding incoming affinity number) is or has been assigned a higher relative priority than the current call (with its corresponding current affinity number), step 515, then the incoming affinity number (corresponding to the incoming call) is inserted in the next higher priority group or set than the current affinity number (corresponding to the current call), step 520, and this database management routine may end, return step 545.

When the incoming call (with its corresponding incoming affinity number) is not or has not been assigned a higher relative priority than the current call (with its corresponding current affinity number) in step 515, the method proceeds to step 525. In step 525, the method determines whether the incoming call (with its corresponding incoming affinity number) has been assigned the same comparative priority as the current call (with its corresponding current affinity number). When the incoming call has been assigned the same priority, step 525, then the incoming affinity number (corresponding to the incoming call) is inserted in the same priority group or set as the current affinity number (corresponding to the current call), step 530, and this database management routine also may end, return step 545.

Continuing to refer to FIG. 6, when the incoming call (with its corresponding incoming affinity number) is not or has not been assigned the same relative priority as the current call (with its corresponding current affinity number) in step 525, the method proceeds to step 535. In step 535, the method determines whether the incoming call (with its corresponding incoming affinity number) has been assigned a lower comparative priority than the current call (with its corresponding current affinity number). When the incoming call has been assigned a lower priority, step 535, then the incoming affinity number (corresponding to the incoming call) is inserted in the next lower priority group or set than the current affinity number (corresponding to the current call), step 540, and this database management routine also may end, return step 545.

Figure 7:
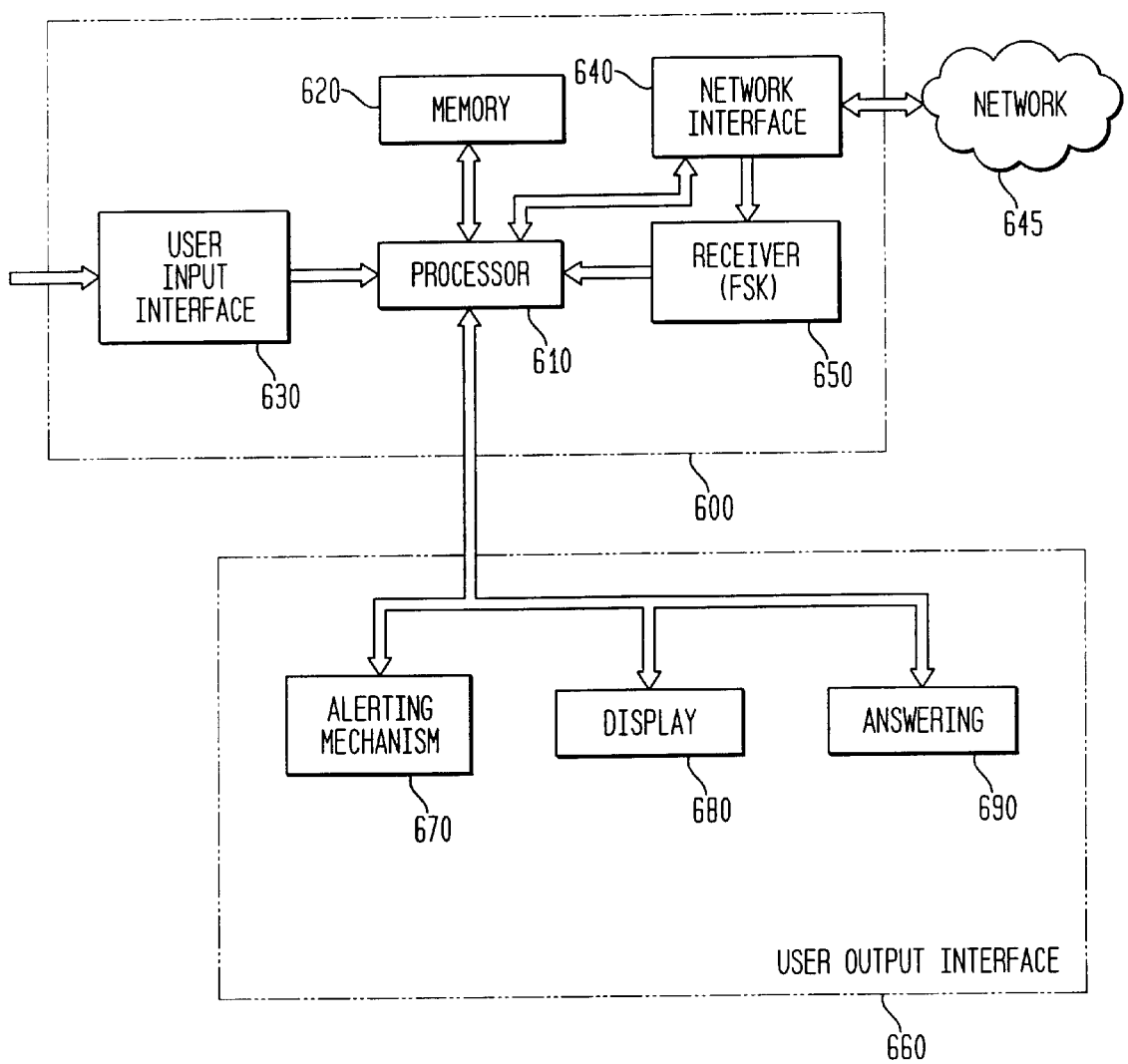
FIG. 7 is a block diagram illustrating an apparatus embodiment in accordance with the present invention.

FIG. 7 is a block diagram illustrating an apparatus embodiment in accordance with the present invention. The apparatus 600 may be included, for example, in a telephone or other customer premise equipment. Referring to FIG. 7, the apparatus 600 includes a processor 610, a memory 620, a user input interface 630, a network interface 640, and a receiver (or decoder) 650 (such as an FSK (frequency shift keying) receiver or decoder. In the preferred embodiment, the apparatus 600 also includes a user output interface 660, which may have one or more output devices such as alerting mechanism 670, a display 680, or an answering mechanism 690.

Continuing to refer to FIG. 7, the processor 610 (and processor 710 of FIGS. 7 and 8) may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed in greater detail below, with associated memory, such as microprocessor memory or additional RAM, ROM, EPROM or E²PROM. As indicated above with reference to FIGS. 1–6, the methodology of the invention may be programmed and stored, in the processor 610 (and processor 710, FIGS. 7 and 8) with its associated memory and other equivalent components, as a set of program instructions for subsequent execution when the processor 610 (or 710) is operative (i.e., the processor 610 or 710 is powered on and functioning).

The user input interface 630, such as a keypad, is utilized to receive input from the user, such as the input of a number to be dialed. The user input interface 630 may also be utilized for manual overrides and user preference and priority programming discussed above. The memory 620 is utilized for the storage of the user's affinity database. The network interface 640 provides connectivity to a network 646, such as providing tip and ring connections to a public (or general) switched telephone network. The receiver (or decoder) 650 is utilized to decode incoming signals which encode incoming caller ID information, typically utilizing FSK encoding. An equivalent or another type of receiver may also be utilized in the event incoming caller ID information is encoded in a format other than FSK. The user output interface 660, as mentioned above, may contain one or more output devices to alert or signal the user to an incoming call or screened call. For example, the alerting mechanism 670 may be an auditory or other audible ringer, the display 680 may be a visual display such as an LCD display, and the answering mechanism 690 may be a telephone call answering or voice mail system.

As discussed above with reference to FIGS. 1–6, when an incoming call is received by the network interface 640, incoming caller ID information is decoded by receiver 650, and examined by processor 610 to determine whether the incoming call is from a source within the affinity database, as stored within the memory 620. When the incoming call is from a source within the affinity database (step 120, FIG. 1), the processor 610 gives it corresponding priority treatment (steps 125, 130 and 135), such as interrupting and alerting the user to the incoming call, through alerting mechanism 670 or display 680. Similarly, when the incoming call is not from a source within the affinity database (step 120) or does not include caller ID information (step 110), the processor 610 gives that incoming call a lower priority service (step 140), such as routing that call to an answering mechanism 690.

Similarly, the processor 610 creates the affinity database, to be stored in memory 620, from user originated calls (the routine of FIG. 2) via the user input interface 630, and incoming calls (the routine of FIG. 3) via the network interface 640 and receiver 650. The processor 610 also manages the affinity database or stack via its program instructions (the method of FIGS. 5–6 or another database management method) and the memory 620. The processor 610 also manages the comparative priorities between and among the affinity numbers of the affinity database via its program instructions (the methods of FIG. 5 or FIG. 6), the memory 620, and the user input interface 630.

Figure 8:
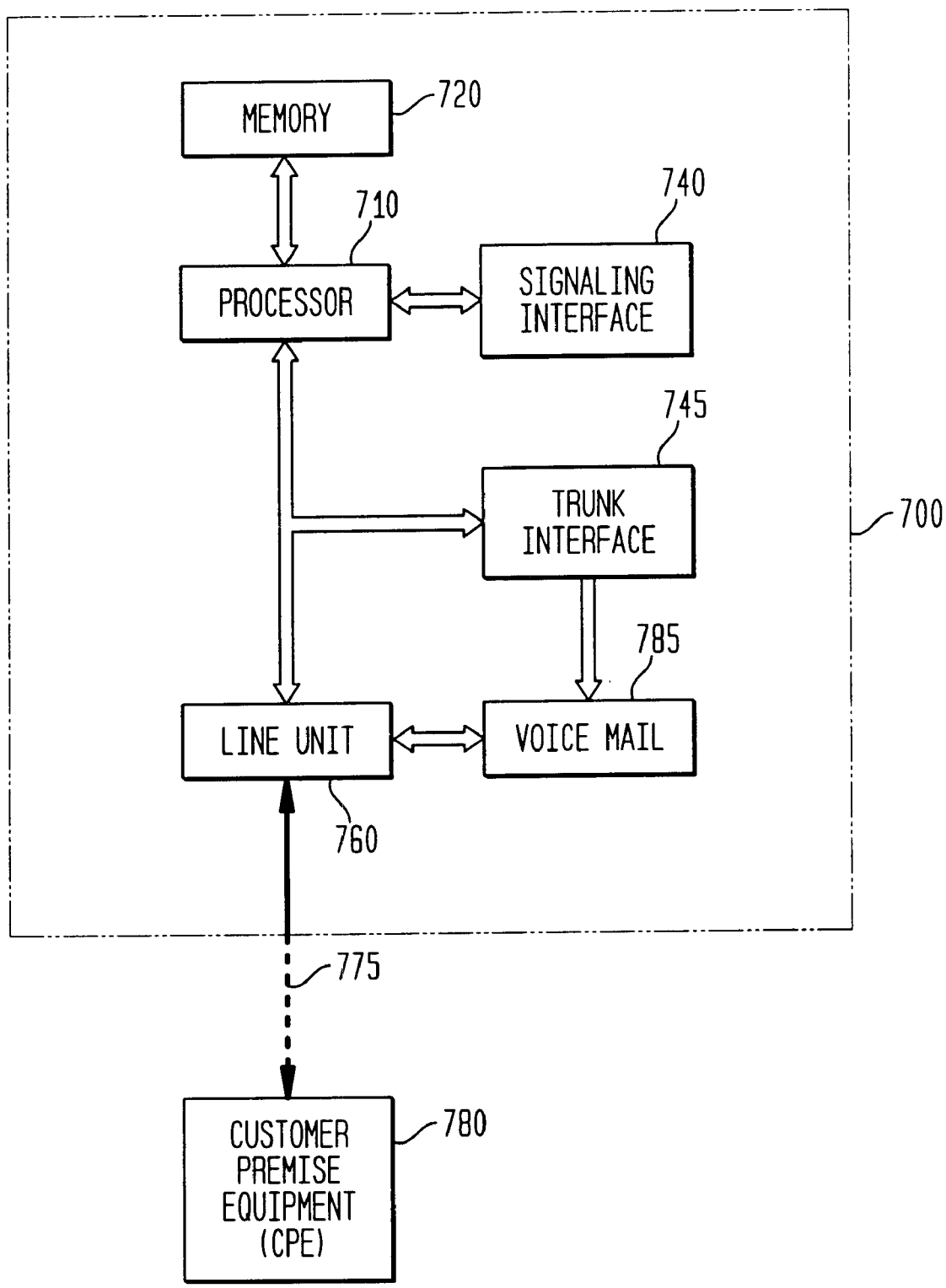
FIG. 8 is a block diagram illustrating a first system embodiment in accordance with the present invention.

FIG. 8 is a block diagram illustrating a first system embodiment in accordance with the present invention. The system 700 may be included within, for example, a telephone network switch, in a network central office, or within other telecommunication service provider equipment which provides service to customer premise equipment 780. As in the apparatus 600 embodiment, the system 700 also includes a processor 710 and a memory 720. The system 700 also includes a signaling interface 740 (such as an SS7 signaling interface) for, among other things, interfacing to a signaling portion of a network, and a trunk (or trunking) interface 745 for interfacing to a voice portion of a network. For telecommunications, such as voice and data communications, the signaling portion of the network typically transports caller ID information and the called telephone number to the network switch (or switching fabric). At the same time, the trunking interface 745 (or trunking portion of the network) provides the path for a corresponding network communication, such as the path for a voice or data call. The system 700 is couplable typically through a twisted pair communication channel 775 to customer premise equipment 780 via a line unit 760.

As discussed above with reference to FIGS. 1–6, when an incoming call is received by the signaling interface 740 for the customer premises 780, incoming caller ID information examined by the processor 710 to determine whether the incoming call is from a source within the affinity database, as stored within the memory 720. When the incoming call is from a source within the affinity database (step 120, FIG. 1), the processor 710 gives this incoming call, as a corresponding network communication in the trunking portion of the network, corresponding priority treatment (steps 125, 130 and 135), such as interrupting and alerting the user to the incoming call (such as providing a distinctive tone), through line unit 760. Similarly, when the incoming call is not from a source within the affinity database (step 120) or does not include caller ID information (step 110), the processor 710 gives that incoming call (as a corresponding network communication in the trunking portion of the network) a lower priority service (step 140), such as routing that corresponding network communication (call) to a voice mail system 785 or other answering and/or messaging system.

Similarly, the processor 710 creates the affinity database, to be stored in memory 720, from user originated calls (the routine of FIG. 2) via the line unit 760, and incoming calls (the routine of FIG. 3) via the signaling interface 740. The processor 710 also manages the affinity database or stack via its program instructions (the methods of FIG. 5 or FIG. 6) and the memory 720. The processor 710 also manages the comparative priorities between and among the affinity numbers of the affinity database via its program instructions (the method of FIG. 4), the memory 720, and the line unit 760.

As indicated above, in these various system embodiments 700 and 800 (discussed below with reference to FIG. 9), when embodied within a network central office, the various systems 700 and 800 may also receive caller ID information from a calling party which is designated as private. This private caller ID information is typically not displayed to the called party, but is received or otherwise known to the central office. Under these circumstances, without disclosure to the called party and still maintaining the privacy of the information, the private caller ID information may still be utilized for call screening and alerting in accordance with the present invention. As with any caller ID information, the usage patterns may still be observed for the database management and call screening purposes herein, and the requested privacy maintained by not downloading or disclosing the private information to the called party.

Figure 9:
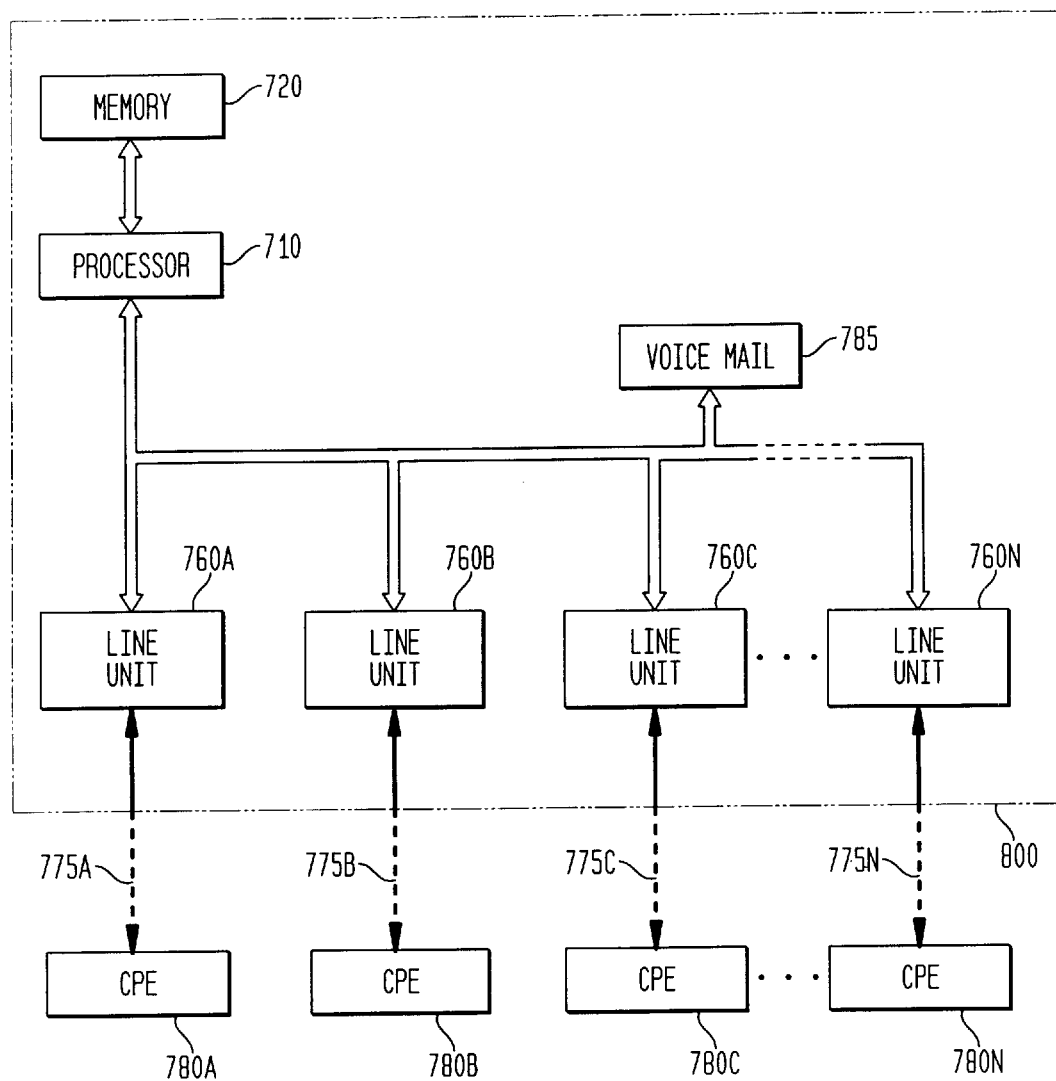
FIG. 9 is a block diagram illustrating a second system embodiment in accordance with the present invention.

FIG. 9 is a block diagram illustrating a second system embodiment in accordance with the present invention. The system 800 also may be included within, for example, a telephone network switch, in a network central office, or within other telecommunication service provider equipment which provides service to customer premise equipment ("CPE") 780A, 780B, 780C through 780N. The system 800 is utilized for line to line calls and, as a consequence, does not.require the signaling interface 740 or the trunk interface 745 of the system 700. As in the apparatus 600 embodiment and the system 700 embodiment, the system 800 also includes a processor 710 and a memory 720. Also as in the system 700 embodiment, the system 800 includes a voice mail unit 785, and additionally includes a plurality of line units 760A, 760B, 760C through 760N (collectively line units 760), which are respectively couplable to a corresponding plurality of CPEs 780A, 780B, 780C through 780N (collectively CPEs 780), via respective communication channels 775A, 775B, 775C through 775N. Typically, and in the preferred embodiments, the systems 700 and 800 are combined into one overall system for handling both trunk calls and line to line calls.

As discussed above with reference to FIGS. 1–7, when an incoming call is received by one of the line units 760, the processor 710 examines the incoming call to determine if the call is to be routed to one of the line units 760 under the control or auspices of the processor 710. For such line to line calls, the incoming caller ID information is examined by the processor 710 to determine whether the incoming call is from a source within the affinity database, as stored within the memory 720. When the incoming call is from a source within the affinity database (step 120, FIG. 1), the processor 710 gives this incoming call, corresponding priority treatment (steps 125, 130 and 135), such as interrupting and alerting the user to the incoming call (such as providing a distinctive tone), through one of the line units 760 which is connected to the user's CPE 780. Similarly, when the incoming call is not from a source within the affinity database (step 120) or does not include caller ID information (step 110), the processor 710 gives that incoming call a lower priority service (step 140), such as routing that corresponding network communication (call) to a voice mail system 785 or other answering and/or messaging system.

Similarly, the processor 710 creates the affinity database, to be stored in memory 720, from user originated calls (the routine of FIG. 2) and incoming calls (the routine of FIG. 3), both via the line units 760. The processor 710 also manages the affinity database or stack via its program instructions (the methods of FIG. 5 or FIG. 6) and the memory 720. The processor 710 also manages the comparative priorities between and among the affinity numbers of the affinity database via its program instructions (the method of FIG. 4), the memory 720, and the line unit 760.

As may be apparent from the above discussion, there are numerous advantages of the present invention. First, the present invention provides for incoming call screening and alerting automatically for call waiting applications, without personal involvement in the screening process. The present invention provides such automatic screening in accordance with the personal and tailored needs, tastes and preferences of the individual telecommunication consumer. In addition, the apparatus, method and system are user friendly, cost effective, and capable of implementation in existing telecommunication systems.

The present invention is able to provide such automatic personal call screening and alerting while incorporates the "organic persona" concept. Not only are these services personalized or customized to the needs or preferences of individual consumers, but also the telecommunication network or system, or the customer premise equipment, automatically learns these preferences by observing the actual or real actions or activities of the individual consumer. These various embodiments of the present invention thereby provide significant advantages to a telecommunication consumer.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

I claim:

1. A method for personal telecommunication call screening and alerting during a first telecommunication call, the method comprising:
   (a) receiving a second telecommunication call;
   (b) determining a relative priority of the second telecommunication call, of a plurality of relative priorities; wherein at least one relative priority, of the plurality of relative priorities, is automatically determined based upon previously observed user behavior, the automatic determination further based upon a pair-wise comparison of prior user treatment of an incoming telecommunication call during a current telecommunication call;
   (c) when the second telecommunication call has a same relative priority or a higher relative priority than the first telecommunication call, providing a first level of priority service to the second telecommunication call; and
   (d) when the second telecommunication call has a lower relative priority than the first telecommunication call, providing a second level of priority service to the second telecommunication call.

2. The method of claim 1, wherein the first level of priority service comprises providing a user alert to the second telecommunication call, wherein the user alert is a distinctive indicator of the same relative priority or the higher relative priority of the second telecommunication call.

3. The method of claim 2 wherein the user alert is a distinctive call waiting tone.

4. The method of claim 1, further comprising:
   (e) when the second telecommunication call has no predetermined relative priority, providing a second level of priority service to the second telecommunication call.

5. The method of claim 1, wherein the second level of priority service comprises providing telecommunication messaging and answering to the second telecommunication call.

6. The method of claim 1, wherein the second level of priority service comprises providing a user alert to the second telecommunication call, wherein the user alert is a distinctive indicator of the lower relative priority of the second telecommunication call.

7. The method of claim 1, wherein at least one relative priority, of the plurality of relative priorities, is determined by prior user assignment.

8. The method of claim 1, further comprising assigning a lower relative priority to the incoming telecommunication call when the incoming telecommunication call has not been allowed to interrupt the current telecommunication call.

9. The method of claim 1, further comprising assigning a higher relative priority to the incoming telecommunication call when the incoming telecommunication call has been selected for continued communication while the current telecommunication call has been terminated.

10. The method of claim 1, further comprising assigning a lower relative priority to the incoming telecommunication call when the current telecommunication call has been selected for continued communication while the incoming telecommunication call has been terminated.

11. The method of claim 1, further comprising assigning a same relative priority to the incoming telecommunication call when the incoming telecommunication call has been selected for continued communication concurrently with the current telecommunication call.

12. The method of claim 1, wherein step (b) further comprises, when the second telecommunication call does not include caller identification information, assigning a lowest relative priority to the second telecommunication call and providing a third level of priority service to the second telecommunication call.

13. The method of claim 1, wherein step (b) further comprises, when the second telecommunication call does not include caller identification information associated with an affinity number, assigning a lowest relative priority to the second telecommunication call and providing a third level of priority service to the second telecommunication call.

14. The method of claim 1, wherein step (b) further comprises accessing an affinity database, wherein the affinity database stores a plurality of affinity numbers and, for each affinity number of the plurality, further stores a corresponding relative priority of the plurality of relative priorities.

15. The method of claim 14, wherein the plurality of affinity numbers are determined by including directory numbers corresponding to outgoing telecommunication calls.

16. The method of claim 14, wherein the plurality of affinity numbers are determined by including directory numbers corresponding to received incoming calls having a predetermined minimum duration.

17. An apparatus for personal telecommunication call screening and alerting during a first telecommunication call, the apparatus comprising:
   a network interface for receiving a second telecommunication call;
   a receiver coupled to the network interface;
   a memory; and a processor coupled to the memory and to the receiver, wherein the processor includes instructions for determining a relative priority of the second telecommunication call, of a plurality of relative priorities; the processor having further instructions for automatically determining at least one relative priority, of the plurality of relative priorities, based upon previously observed user behavior, the automatic determination further based upon a pair-wise comparison of prior user treatment of an incoming telecommunication call during a current telecommunication call; the processor having further instructions for providing a first level of priority service to the second telecommunication call when the second telecommunication call has a same relative priority or a higher relative priority than the first telecommunication call, and for providing a second level of priority service to the second telecommunication call when the second telecommunication call has a lower relative priority than the first telecommunication call.

18. The apparatus of claim 17, wherein the processor has further instructions, when the second telecommunication call has no predetermined relative priority, for providing a second level of priority service to the second telecommunication call.

19. The apparatus of claim 17, further comprising:
   a user output interface coupled to the processor, the user output interface for generating a user alert; and
   wherein the processor includes further instructions for providing the user alert for the second telecommunication call having the first level of priority service, wherein the user alert is a distinctive indicator of the same relative priority or the higher relative priority of the second telecommunication call.

20. The apparatus of claim 19 wherein the user alert is a distinctive call waiting tone.

21. The apparatus of claim 19, wherein the user output interface includes answering and messaging circuitry, and wherein the processor includes further instructions for providing telecommunication messaging and answering to the second telecommunication call having the second level of priority service.

22. The apparatus of claim 19, wherein the processor includes further instructions for providing a user alert to the second telecommunication call having the second level of priority service, wherein the user alert is a distinctive indicator of the lower relative priority of the second telecommunication call.

23. The apparatus of claim 17, further comprising:
a user input interface coupled to the processor for receiving user input; and wherein at least one relative priority, of the plurality of relative priorities, is assigned by prior user input.

24. The apparatus of claim 17, wherein the processor includes further instructions for assigning a lower relative priority to the incoming telecommunication call when the incoming telecommunication call has not been allowed to interrupt the current telecommunication call.

25. The apparatus of claim 17, wherein the processor includes further instructions for assigning a higher relative priority to the incoming telecommunication call when the incoming telecommunication call has been selected for continued communication while the current telecommunication call has been terminated.

26. The apparatus of claim 17, wherein the processor includes further instructions for assigning a lower relative priority to the incoming telecommunication call when the current telecommunication call has been selected for continued communication while the incoming telecommunication call has been terminated.

27. The apparatus of claim 17, wherein the processor includes further instructions for assigning a same relative priority to the incoming telecommunication call when the incoming telecommunication call has been selected for continued communication concurrently with the incoming telecommunication call.

28. The apparatus of claim 17, wherein the receiver decodes caller identification information from the second telecommunication call, and wherein the processor includes further instructions for assigning a lowest relative priority to the second telecommunication call and providing a third level of priority service to the second telecommunication call when the second telecommunication call does not include caller identification information.

29. The apparatus of claim 17, wherein the receiver decodes caller identification information from the second telecommunication call, and wherein the processor includes further instructions for assigning a lowest relative priority to the second telecommunication call and providing a third level of priority service to the second telecommunication call when the second telecommunication call does not include caller identification information associated with an affinity number.

30. The apparatus of claim 17, wherein the memory stores an affinity database having a plurality of affinity numbers and, for each affinity number of the plurality, the memory further stores a corresponding relative priority of the plurality of relative priorities.

31. The apparatus of claim 30, further comprising:
a user input interface coupled to the processor for entry of a directory number corresponding to an outgoing telecommunication call; and
wherein the processor includes further instructions for determining the plurality of affinity numbers by including in the affinity database directory numbers corresponding to outgoing telecommunication calls.

32. The apparatus of claim 30, wherein the processor includes further instructions for determining the plurality of affinity numbers by including in the affinity database directory numbers corresponding to received incoming telecommunication calls having a predetermined minimum duration.

33. The apparatus of claim 17, wherein the apparatus is embodied within customer premise equipment.

34. The apparatus of claim 17, wherein the apparatus is embodied within a telephone.

35. A system for personal telecommunication call screening and alerting during a first network communication, the system comprising:
a line unit couplable to customer premise equipment;
a network signaling interface for receiving network signaling information;
a network trunk interface for receiving a second network communication;
a memory; and
a processor coupled to the memory, to the line unit, to the network signaling interface, and to the network trunk interface, wherein the processor includes instructions for determining a relative priority of the second network communication, from a plurality of relative priorities; the processor having further instructions for automatically determining at least one relative priority, of the plurality of relative priorities, based upon previously observed user behavior, the automatic determination further based upon a pair-wise comparison of prior user treatment of an incoming telecommunication call during a current telecommunication call; the processor having further instructions for providing a first level of priority service to the second network communication when the second network communication has a same relative priority or a higher relative priority than the first network communication, and for providing a second level of priority service to the second network communication when the second network communication has a lower relative priority than the first network communication.

36. The system of claim 35, wherein the processor includes further instructions, when the second telecommunication call has no predetermined relative priority, for providing a second level of priority service to the second telecommunication call.

37. The system of claim 35, wherein the processor includes further instructions to direct the line unit to provide a user alert to the second network communication having the first level of priority service, wherein the user alert is a distinctive indicator of the same relative priority or the higher relative priority of the second network communication.

38. The system of claim 37, wherein the user alert is a distinctive call waiting tone.

39. The system of claim 35, further comprising voice mail circuitry coupled to the line unit and the network trunk interface for providing telecommunication messaging and answering for the second network communication having the second level of priority service.

40. The system of claim 35, wherein the processor includes further instructions to direct the line unit to provide a user alert to the second network communication having the second level of priority service, wherein the user alert is a distinctive indicator of the lower relative priority of the second network communication.

41. The system of claim 35, wherein the line unit receives user input; and wherein at least one relative priority, of the plurality of relative priorities, is assigned by prior user input.

42. The system of claim 35, wherein the processor includes further instructions for assigning a lower relative priority to the incoming network communication when the incoming network communication has not been allowed to interrupt the current network communication.

43. The system of claim 35, wherein the processor includes further instructions for assigning a higher relative priority to the incoming network communication when the incoming network communication has been selected for continued communication while the current network communication has been terminated.

44. The system of claim 35, wherein the processor includes further instructions for assigning a lower relative priority to the incoming network communication when the current network communication has been selected for continued communication while the incoming network communication has been terminated.

45. The system of claim 35, wherein the processor includes further instructions for assigning a same relative priority to the incoming network communication when the incoming network communication has been selected for continued communication concurrently with the current network communication.

46. The system of claim 35, wherein the processor includes further instructions for assigning a lowest relative priority to the second network communication and providing a third level of priority service to the second network communication when network signaling information corresponding to the second network communication does not include caller identification information.

47. The system of claim 35, wherein the processor includes further instructions for assigning a lowest relative priority to the second network communication and providing a third level of priority service to the second network communication when network signaling information corresponding to the second network communication does not include caller identification information associated with an affinity number.

48. The system of claim 35, wherein the memory stores an affinity database having a plurality of affinity numbers and, for each affinity number of the plurality, the memory further stores a corresponding relative priority of the plurality of relative priorities.

49. The system of claim 48, wherein the line unit receives a directory number corresponding to an outgoing telecommunication call; and wherein the processor includes further instructions for determining the plurality of affinity numbers by including in the affinity database the directory number corresponding to the outgoing telecommunication call.

50. The system of claim 48, wherein the processor includes further instructions for determining the plurality of affinity numbers by including in the affinity database a directory number corresponding to a user received incoming telecommunication call having a predetermined minimum duration.

51. The system of claim 35, wherein the system is embodied in a network switch.

52. The system of claim 35, wherein the system is embodied in a central office.

53. A system for personal telecommunication call screening and alerting during a first communication, the system comprising:
a line unit couplable to customer premise equipment to receive a second communication;
a memory; and
a processor coupled to the memory and to the line unit, wherein the processor includes instructions for determining a relative priority of the second communication, of a plurality of relative priorities; the processor having further instructions for automatically determining at least one relative priority, of the plurality of relative priorities, based upon previously observed user behavior, the automatic determination further based upon a pair-wise comparison of prior user treatment of an incoming telecommunication call during a current telecommunication call; the processor having further instructions for providing a first level of priority service to the second communication when the second communication has a same relative priority or a higher relative priority than the first communication, and for providing a second level of priority service to the second communication when the second communication has a lower relative priority than the first communication.

54. The system of claim 53, wherein the processor includes farther instructions, when the second telecommunication call has no predetermined relative priority, for providing a second level of priority service to the second telecommunication call.

55. The system of claim 53, wherein the processor includes further instructions to direct the line unit to provide a user alert to the second communication having the first level of priority service, wherein the user alert is a distinctive indicator of the same relative priority or the higher relative priority of the second communication.

56. The system of claim 55, wherein the user alert is a distinctive call waiting tone.

57. The system of claim 53, further comprising voice mail circuitry coupled to the line unit for providing telecommunication messaging and answering for the second communication having the second level of priority service.

58. The system of claim 53, wherein the processor includes further instructions to direct the line unit to provide a user alert to the second communication having the second level of priority service, wherein the user alert is a distinctive indicator of the lower relative priority of the second communication.

59. The system of claim 53, wherein the line unit receives user input; and wherein at least one relative priority, of the plurality of relative priorities, is assigned by prior user input.

60. The system of claim 53, wherein the processor includes further instructions for assigning a lower relative priority to the incoming communication when the incoming communication has not been allowed to interrupt the current communication.

61. The system of claim 53, wherein the processor includes further instructions for assigning a higher relative priority to the incoming communication when the incoming communication has been selected for continuation while the current communication has been terminated.

62. The system of claim 53, wherein the processor includes further instructions for assigning a lower relative priority to the incoming communication when the current communication has been selected for continuation while the incoming communication has been terminated.

63. The system of claim 53, wherein the processor includes further instructions for assigning a same relative priority to the incoming communication when the incoming communication has been selected for continuation concurrently with the current communication.

64. The system of claim 53, wherein the processor includes further instructions for assigning a lowest relative priority to the second communication and providing a third level of priority service to the second communication when the second communication does not include caller identification information.

65. The system of claim 53, wherein the processor includes further instructions for assigning a lowest relative priority to the second communication and providing a third level of priority service to the second communication when the second communication does not include caller identification information associated with an affinity number.

66. The system of claim 53, wherein the memory stores an affinity database having a plurality of affinity numbers and, for each affinity number of the plurality, the memory further stores a corresponding relative priority of the plurality of relative priorities.

67. The system of claim 66, wherein the line unit receives a directory number corresponding to an outgoing telecommunication call; and wherein the processor includes further instructions for determining the plurality of affinity numbers by including in the affinity database the directory number corresponding to the outgoing telecommunication call.

68. The system of claim 66, wherein the processor includes further instructions for determining the plurality of affinity numbers by including in the affinity database a directory number corresponding to a user received incoming telecommunication call having a predetermined minimum duration.

69. The system of claim 53, wherein the system is embodied in a network switch.

70. The system of claim 53, wherein the system is embodied in a central office.

* * * * *